E. T. MALLOY.
CASTER WHEEL.
APPLICATION FILED JULY 31, 1918.

1,288,949.

Patented Dec. 24, 1918.

Witness:
Charles Vollbrecht

Edward T. Malloy
Inventor by James W. See
Attorney

UNITED STATES PATENT OFFICE.

EDWARD T. MALLOY, OF HAMILTON, OHIO, ASSIGNOR TO THE AMERICAN CASTER COMPANY, OF HAMILTON, OHIO.

CASTER-WHEEL.

1,288,949.

Specification of Letters Patent. Patented Dec. 24, 1918.

Application filed July 31, 1918. Serial No. 247,483.

*To all whom it may concern:*

Be it known that I, EDWARD T. MALLOY, a citizen of the United States, residing at Hamilton, Butler county, Ohio, have invented certain new and useful Improvements in Caster-Wheels, of which the following is a specification.

This invention, devised with caster and truck wheels particularly in view, has reference to the provision of the wheel with a rubber-tire, and the invention will be readily understood from the following description taken in connection with the accompanying drawing in which:—

Figure 1:
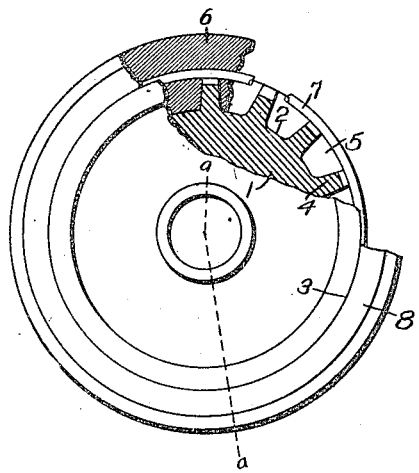
Figure 2:
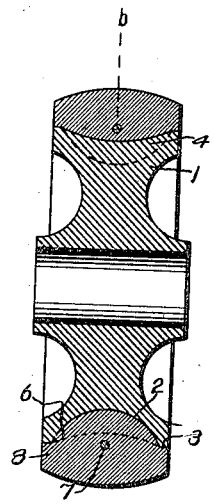

Figure 1 is a side elevation of a caster wheel exemplifying my improvement, a portion of this figure appearing in vertical section in the plane of line *b* of Fig. 2; and Fig. 2 a vertical section of the same in the plane of line *a* of Fig. 1.

In the drawings:—

1, indicates the circular center of the wheel, assumed as being of metal;

2, a circumferential groove in the periphery thereof;

3, peripheral portions of the center, at each side of the groove;

4, ribs disposed in the groove and crossing the same, the outer portions of these ribs being themselves preferably a trifle concave;

5, the circumferential series of recesses formed around the wheel between the ribs;

6, rubber projections fitting these recesses;

7, a metallic wire encircling the series of ribs; and 8, the rubber-tire exterior to the peripheral portions 3 of the center and joining the fillings 6 and having the wire 7 embedded within it, all of the rubber parts of the device being vulcanized together and inherently to the metallic parts.

The method of production is, preferably, to first treat the metallic center and the metallic wire in a manner suitable for the amalgamation of the rubber to them in the process of vulcanization. The recesses 5 are then to be filled with raw rubber, after which the wire is to be put in place, the wire being preferably an endless ring, made so by twisting or otherwise joining the ends of the wire of which it is formed. Masses of the raw rubber are then to be applied to embed the wire and flush up the groove, about even with the peripheral portions 3. A winding of ribbon of raw rubber is then to be applied to build up the tire, after which the rubber is to be vulcanized to render integral the rubber portions of the structure and cause the rubber to adhere to the metallic center and to the wire.

I claim:—

1. A caster wheel comprising, a circular metallic center provided in its periphery with a transverse concave concentric groove margined by peripheral portions at each side of the groove, ribs formed integrally with the center and crossing the grooves and presenting outward concavities and forming pockets between them, and a rubber tire having an outer portion extending the full width of the center and fitting the peripheral portions thereof, and fitting the concave outer surfaces of said ribs and having transversely convex interior projections fitting the pockets between the ribs, combined substantially as set forth.

2. A caster wheel comprising, a circular metallic center provided in its periphery with a transverse concave concentric groove margined by peripheral portions at each side of the groove, ribs formed integrally with the center and crossing the grooves and presenting outward concavities and forming pockets between them, a rubber tire having an outer portion extending the full width of the center and fitting the peripheral portions thereof and fitting the concave outer surfaces of said ribs and having transversely convex interior projections fitting the pockets between the ribs, and an endless wire embedded within the tire exterior to the ribs in said center, combined substantially as set forth.

3. A caster wheel comprising, a circular metallic center provided in its periphery with a transversely concave concentric groove margined by peripheral portions at each side of the groove, ribs formed integrally with the center and crossing the grooves and presenting outward convexities and forming pockets between them, a rubber tire having an outer portion extending the full width of the periphery of the center and fitting the peripheral portions thereof and fitting the concave outer surfaces of said ribs and having transversely convex interior projections fitting the pockets between the ribs, and an endless wire surrounding said ribs and embedded within the tire exterior to said ribs between said peripheral portions, the rubber of the tire and its said projections being vulcanized adherently to the wheel-center and to the wire, combined substantially as set forth.

EDWARD T. MALLOY.

Witnesses:
M. S. BELDEN,
JUSTUS VOLLBRECHT.